United States Patent
Sakakima

(10) Patent No.: US 7,567,723 B2
(45) Date of Patent: Jul. 28, 2009

(54) RESOLUTION CHANGING METHOD AND APPARATUS

(75) Inventor: Eito Sakakima, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 11/068,337

(22) Filed: Mar. 1, 2005

(65) Prior Publication Data

US 2005/0201632 A1 Sep. 15, 2005

(30) Foreign Application Priority Data

Mar. 9, 2004 (JP) .............................. 2004-066109
Feb. 17, 2005 (JP) .............................. 2005-040709

(51) Int. Cl.
*G06K 9/40* (2006.01)

(52) U.S. Cl. ....................... 382/254; 382/300

(58) Field of Classification Search ................ 382/254, 382/300
See application file for complete search history.

(56) References Cited

U.S. PATENT DOCUMENTS

| | | | | |
|---|---|---|---|---|
| 5,008,752 A | * | 4/1991 | Van Nostrand | 348/581 |
| 6,263,120 B1 | | 7/2001 | Matsuoka | 382/300 |
| 6,496,608 B1 | * | 12/2002 | Chui | 382/300 |
| 6,714,688 B1 | * | 3/2004 | Gallagher et al. | 382/266 |
| 7,054,507 B1 | * | 5/2006 | Bradley et al. | 382/300 |
| 2005/0094899 A1 | * | 5/2005 | Kim et al. | 382/300 |

FOREIGN PATENT DOCUMENTS

| | | |
|---|---|---|
| JP | 4-500421 | 1/1992 |
| JP | 11-144053 | 5/1999 |

\* cited by examiner

*Primary Examiner*—Charles Kim
*Assistant Examiner*—Stephen R Koziol
(74) *Attorney, Agent, or Firm*—Fitzpatrick, Cella, Harper & Scinto

(57) ABSTRACT

When a plurality of reference pixels do not include the boundary of a block, the pixel data of an interpolation pixel is computed by performing the first kind of interpolation processing by use of a plurality of the pixel data of the reference pixels. When a plurality of reference pixels include the boundary of a block, the pixel data of an interpolation pixel is computed by performing the second kind of interpolation processing by use of a plurality of the pixel data of the reference pixels. The second kind of interpolation processing is such that produces a smaller effect of enhancing the edge of an image as compared with the first kind of interpolation processing.

4 Claims, 4 Drawing Sheets

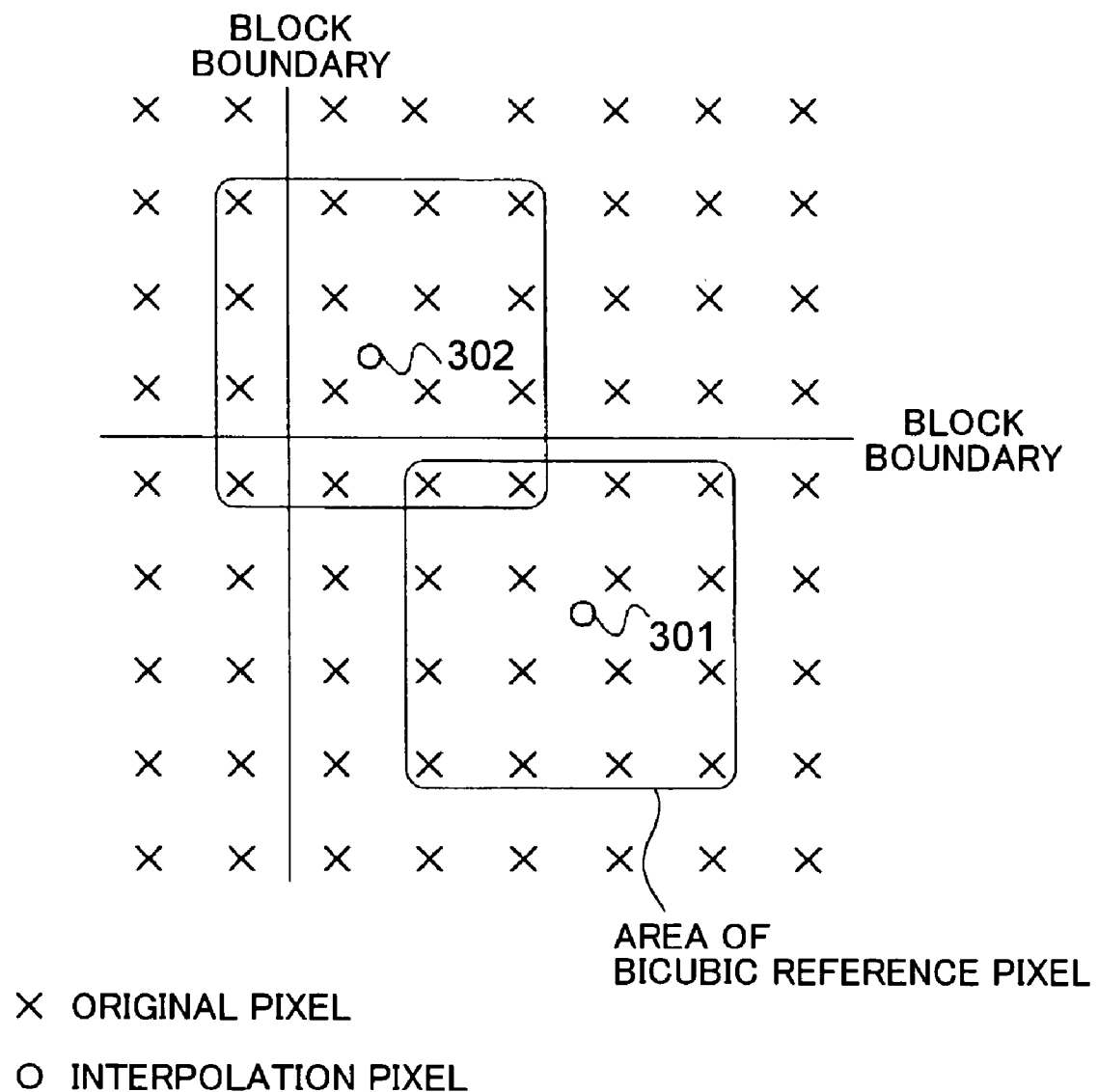

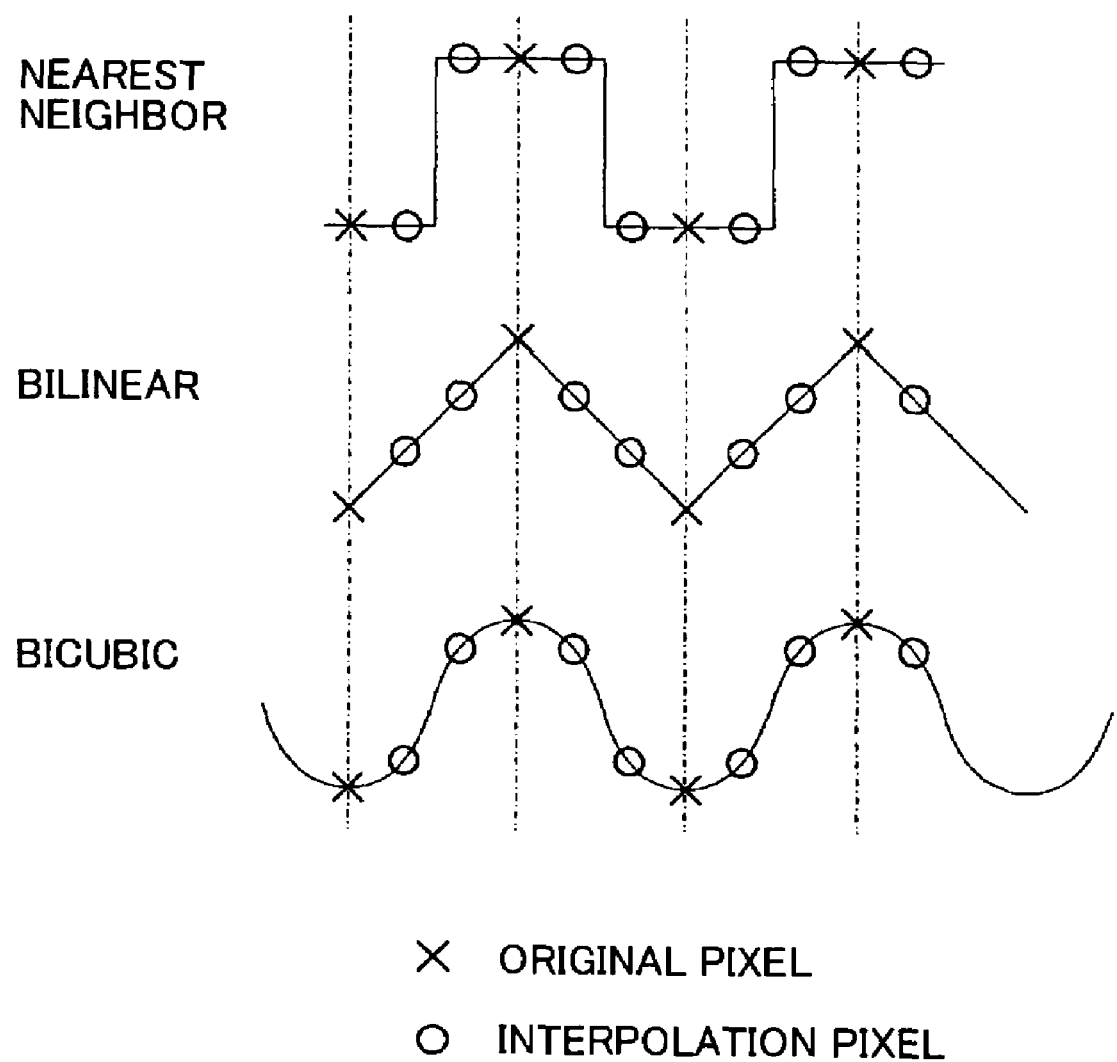

RESOLUTION CHANGING METHOD AND APPARATUS

BACKGROUND OF THE INVENTION

1. Field of the Invention

The present invention relates to a method and apparatus for changing resolution of encoded digital images.

2. Description of the Related Art

Usually, image data has an enormous amount of information. Hence, when image data is transmitted or is recorded on a storage medium, the image data needs to be subjected to some kind of highly-efficient compression processing. As for highly-efficient compression processing, a method using orthogonal transformation encoding processing (for example, DCT (Discrete Cosine Transform)) has now become mainstream. The method is adopted as methods of JPEG (Joint Photographic coding Expert Group) and MPEG (Moving Picture coding Expert Group). The encoding methods will be described in brief.

First, inputted image data is split in blocks of 8×8 pixels. Basically, compression processing is performed by this block. The pixels split in blocks are subjected to orthogonal transformation encoding processing, quantization processing, and then entropy encoding processing, whereby encoded data is obtained. When the encoded data is decoded, the encoded data is subjected in sequence to processings opposite to the encoding processings. Since the orthogonal transformation encoding processing is irreversible processing, original image data can not be completely decoded but the orthogonal transformation encoding processing can realize a very high compression ratio.

On the other hand, image data needs to be subjected to resolution changing (transformation) processing according to the circumstances. When image data taken by a digital camera is displayed on a display medium, if the resolution of image data is higher than the resolution of the display medium, the image data needs to be reduced for display. Also when moving pictures like digital TV broadcast are displayed on a display medium, the resolution of image data needs to be changed according to the resolution of the display medium. Various techniques have been thought for the resolution changing processing of the image data and are broadly divided into resolution changing in a space domain and resolution changing in a frequency domain.

Typical resolution changing methods in a space domain include a nearest neighbor interpolation, a bilinear interpolation, and a bicubic interpolation. Features of these methods are shown in FIG. 4. FIG. 4 shows interpolation pixels ○ when original pixels shown by x are enlarged by 3 times. A vertical axis in FIG. 4 represents the magnitude of a pixel value.

In the nearest neighbor interpolation, the value of an original pixel nearest to a pixel position after transformation is made a new pixel value. Since an operation is not performed for original pixels, a processing speed is high and the difference (edge) between the neighboring pixels of the image can be held as the original image but image quality is said to be usually not good.

The bilinear interpolation is a kind of linear interpolation and performs linear interpolation by using four pixels near a pixel value to be determined. As compared with the nearest neighbor interpolation, the bilinear interpolation can improve image quality but decreases in processing speed. Further, the linear interpolation processing smoothes a portion changing sharply such as an edge of the image, resulting in causing the image appear blurred as a whole.

The bicubic interpolation is a kind of cubic interpolation and performs interpolation by using 16 pixels near a pixel value to be determined. In the bicubic interpolation, a large amount of operation needs to be performed and hence a processing speed is very slow. However, the bicubic interpolation has an effect of enhancing and holding the edge of an original image and hence causes the image to appear less blurred as compared with the bilinear interpolation. The bicubic interpolation is better in image quality than the two techniques described above.

The resolution changing method in a frequency domain is such that adds or deletes pixel values in a state where the image data is subjected to DCT processing to change resolution. When this method is applied to an image stored in a bit map format, pixel values need to be subjected to processing of DCT→resolution changing→IDCT, resulting in increasing processing cost. However, this mode can be applied easily and effectively to images encoded by DCT encoding such as MPEG and JPEG and is said to produce good image quality.

The resolution changing of image data is performed by a method that is selected from these methods so as to serve the object. If resources required to perform the resolution changing processing can be neglected, it is desirable to adopt the bicubic interpolation capable of holding the edge of the image. However, the bicubic interpolation involves a problem of increasing processing cost and a problem of causing images appear blurred near edges, so that a technique of switching resolution changing methods between near the edge of image data and in the other domain is proposed as disclosed in U.S. Pat. No. 5,008,752 (Japanese Unexamined Patent Publication No. 4-500421) and U.S. Pat. No. 6,263,120 (Japanese Unexamined Patent Publication No. 11-144053).

However, the resolution changing processing by the bicubic interpolation is sufficiently satisfactory for the image data of JPEG or MPEG encoded by the above-described orthogonal transformation encoding. In the encoding using the orthogonal transformation encoding, image data is encoded by block as described above, so that there are cases where a discontinuous portion occurs on the boundary of a split block of 8×8 pixels. This is called block noise. Block noise more easily occurs as the compression ratio of an encoded image is increased.

If the decoded image data having this block noise is subjected to the resolution changing processing of the bicubic interpolation, there is a possibility that the discontinuous portion of the block boundary is enhanced to increase block noise to degrade image quality remarkably.

SUMMARY OF THE INVENTION

The object of the invention is to provide a method and an apparatus for performing high-quality resolution changing at the time of changing the resolution of an image.

According to a first aspect of the present invention, there is provided a resolution changing method for changing the resolution of image data subjected to a predetermined image processing involving block split, the method comprising:

a reference pixel selection step of selecting a plurality of reference pixels to be supplied to an operation of an interpolation pixel from the image data;

a determination step of determining whether or not the plurality of reference pixels include a boundary of the block; and an interpolation pixel data computation step of computing pixel data of an interpolation pixel by performing a first kind of interpolation processing by the use of a plurality of pixel data of the reference pixels when the plurality of reference pixels do not include the boundary of the block and of computing pixel data of an interpolation pixel by performing a second kind of interpolation processing by the use of a plurality of pixel data of the reference pixels when the plurality of reference pixels include the boundary of the block, wherein the second kind of interpolation processing produces a smaller effect of enhancing an edge of an image as compared with the first kind of interpolation processing.

According to a second aspect of the present invention, there is provided a resolution changing method for changing the resolution of image data subjected to a predetermined image processing involving block split, the method comprising:

a reference pixel selection step of selecting a plurality of reference pixels to be supplied to an operation of an interpolation pixel from the image data;

a determination step of determining whether or not the plurality of reference pixels include a boundary of the block; and an interpolation pixel data computation step of computing pixel data of an interpolation pixel by performing a first kind of interpolation processing by the use of a plurality of pixel data of the reference pixels when the plurality of reference pixels do not include the boundary of the block and of computing pixel data of an interpolation pixel by performing a second kind of interpolation processing by the use of a plurality of pixel data of the reference pixels when the plurality of reference pixels include the boundary of the block, wherein the first kind of interpolation processing produces a smaller effect of smoothing a discontinuous portion of the boundary of the block as compared with the second kind of interpolation processing.

According to a third aspect of the present invention, there is provided a resolution changing apparatus for changing the resolution of image data subjected to a predetermined image processing involving block split, the apparatus comprising:

a reference pixel selection unit that selects a plurality of reference pixels to be supplied to an operation of an interpolation pixel from the image data;

a block boundary determination unit that determines whether or not the plurality of selected reference pixels include a boundary of the block;

a pixel computation mode switching unit that determines a mode of computing pixel data of an interpolation pixel from pixel data of the selected reference pixels according to determination result by the block boundary determination unit;

a pixel extraction unit that extracts pixel data of the selected reference pixels; and an interpolation pixel computation unit that computes pixel data of an interpolation pixel from the extracted pixel data of the reference pixels according to a mode determined by the pixel computation mode switching unit, wherein the pixel computation mode switching unit determines a first mode for computing pixel data when the block boundary determination unit determines that the plurality of reference pixels do not include the boundary of the block, and determines a second mode for computing pixel data that produces a smaller effect of enhancing an edge of an image as compared with the first mode when the block boundary determination unit determines that the plurality of reference pixels include the boundary of the block.

According to a fourth aspect of the present invention, there is provided a resolution changing apparatus for changing the resolution of image data subjected to a predetermined image processing involving block split, the apparatus comprising:

a reference pixel selection unit that selects a plurality of reference pixels to be supplied to an operation of an interpolation pixel from the image data;

a block boundary determination unit that determines whether or not the plurality of selected reference pixels include a boundary of the block;

a pixel computation mode switching unit that determines a mode of computing pixel data of an interpolation pixel from pixel data of the selected reference pixels according to determination result by the block boundary determination unit;

a pixel extraction unit that extracts pixel data of the selected reference pixels; and an interpolation pixel computation unit that computes pixel data of an interpolation pixel from the extracted pixel data of the reference pixels according to a mode determined by the pixel computation mode switching unit, wherein the pixel computation mode switching unit determines a first mode for computing pixel data when the block boundary determination unit determines that the plurality of reference pixels do not include the boundary of the block, and determines a second mode for computing pixel data that produces a larger effect of smoothing a discontinuous portion of the boundary of the block as compared with the first mode when the block boundary determination unit determines that the plurality of reference pixels include the boundary of the block.

BRIEF DESCRIPTION OF THE DRAWINGS

FIG. 3 is a diagram to show the relationship between an interpolation pixel and a reference pixel and a block boundary in a resolution changing mode used in the embodiment of the invention; and FIG. 4 is an illustration to show a common resolution changing mode.

DESCRIPTION OF THE PREFERRED
EMBODIMENTS

Hereafter, the preferred embodiments of the invention will be described with reference to the drawings.

Figure 1:
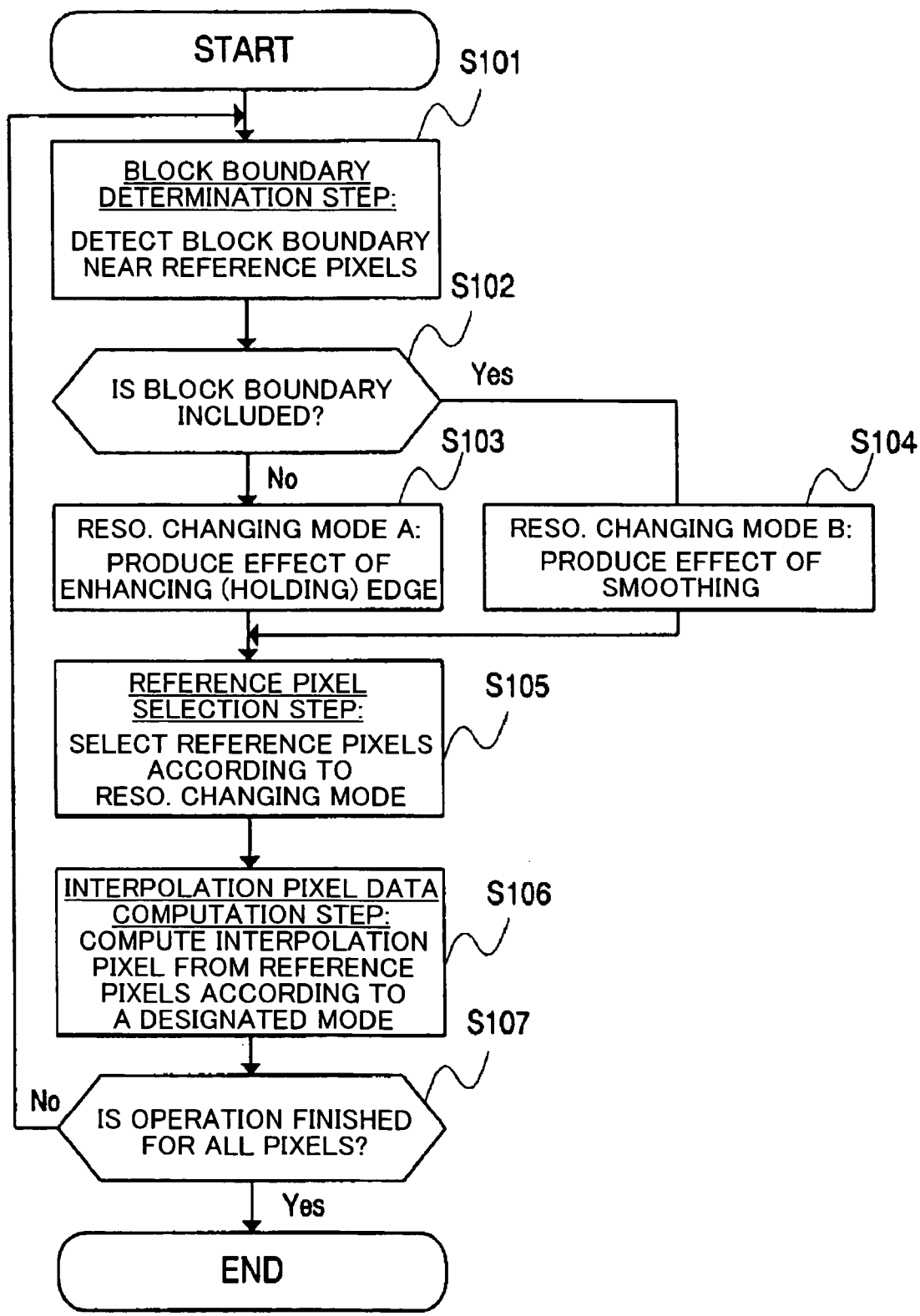
FIG. 1 is a flow chart to show an embodiment of the invention.
Figure 2:
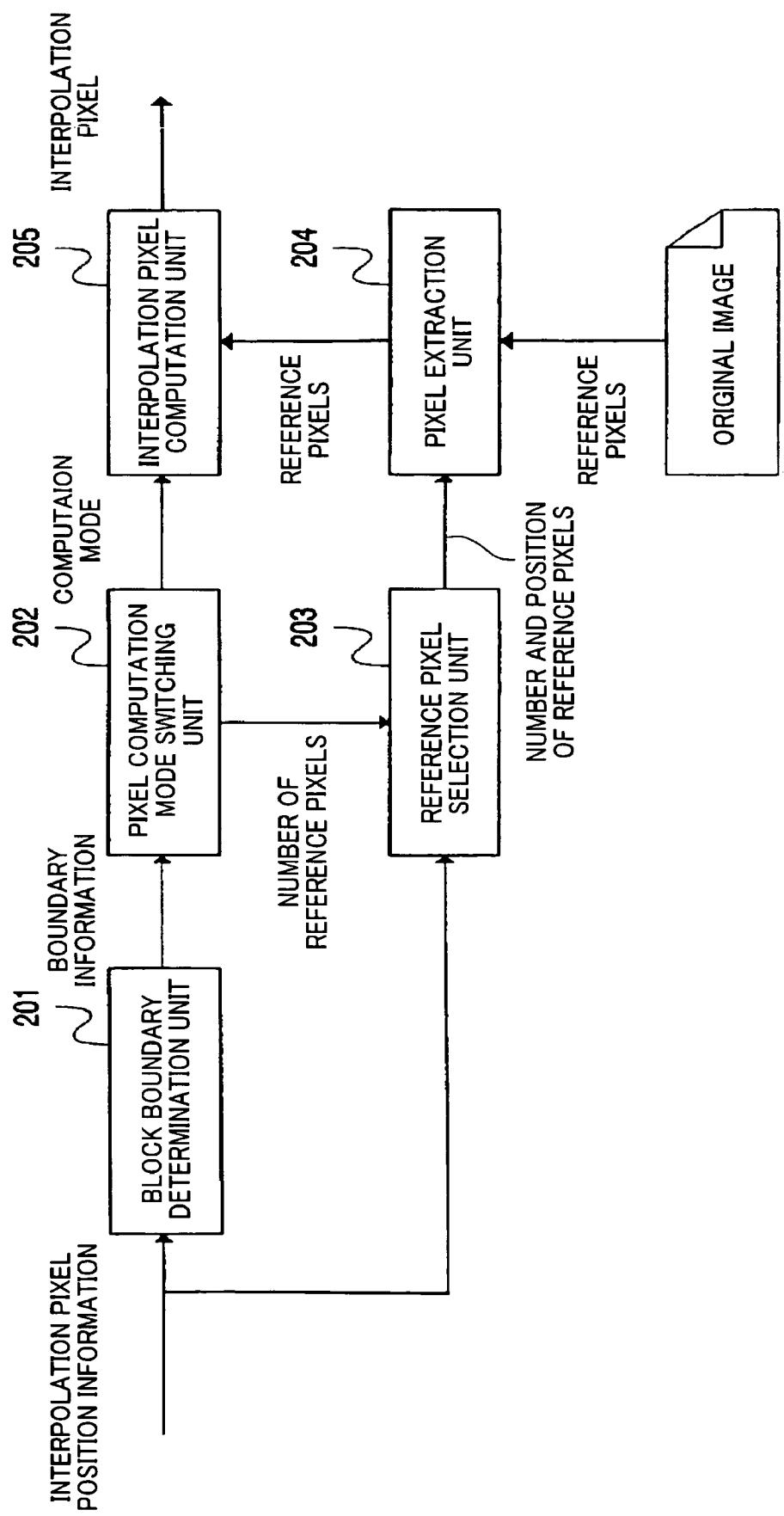
FIG. 2 is a block diagram to show a resolution changing system of a digital image in accordance with the embodiment of the invention.

FIG. 1 is a flow chart to show a resolution changing method in accordance with an embodiment of the invention and FIG. 2 shows an example of system construction of a resolution changing apparatus to realize the method. First, a system construction shown in FIG. 2 will be described.

Here, in this embodiment, image data subjected to highly-efficient compression processing by the orthogonal transformation encoding of DCT will be described. The orthogonal transformation encoding processing has been described in the section of "Description of the Related Art" and hence will not be repeated here.

A block boundary determination unit 201 in FIG. 2 determines on the basis of inputted interpolation pixel position information whether or not a block boundary is included by reference pixels used for computing an interpolation pixel. A flag to show whether or not a block boundary is included by the reference pixels is outputted as determination result (boundary information). A determination method will be described by the use of FIG. 3.

FIG. 3 shows a part of one image to be subjected to resolution changing processing. It is original pixels that are denoted by x and it is interpolation pixels that are denoted by ○. When the interpolation pixels are computed, parts of original pixels are utilized as reference pixels. In this embodiment, the bicubic interpolation mode is utilized for common resolution changing. The reference pixels in the bicubic interpolation mode, as shown in FIG. 3, are 16 pixels (4 pixels high by 4 pixels wide) around the position of the interpolation pixel.

Reference pixels used for computing an interpolation pixel 301 in FIG. 3 are 16 pixels (area surrounded by a thin line) around the interpolation pixel 301. In this case, the reference pixels do not exist across a block boundary, so that it is determined that "the reference pixels do not include a block boundary".

Reference pixels used for computing an interpolation pixel 302 are 16 pixels around the interpolation pixel 302. In this case, the reference pixels exist across a block boundary, so that it is determined that "the reference pixels include a block boundary".

The above determination result is inputted to a pixel computation mode switching unit 202 in FIG. 2. The pixel computation mode switching unit 202 is a part that determines a resolution changing mode for producing an interpolation pixel. The output of the pixel computation mode switching unit 202 is an interpolation pixel computing mode (resolution changing mode) and reference pixel information necessary for the selected computing mode.

As for the interpolation pixels in FIG. 3, the pixel computing mode is switched as follows. As for the interpolation pixel 301, the reference pixels do not include the block boundary, so that the pixel computing mode is a bicubic interpolation mode (the first kind of interpolation processing, the first mode) and the number of reference pixels is 16. On the other hand, as for the interpolation pixel 302, the reference pixels of the bicubic interpolation mode include block boundary, so that the pixel computing mode is switched to a bilinear interpolation mode (the second kind of interpolation processing, the second mode) and the number of reference pixels is 4.

By switching the bicubic interpolation mode and the bilinear interpolation mode, the following effect can be obtained. When the reference pixels do not include the block boundary, the interpolation pixels are computed by the use of the bicubic interpolation mode (the first kind of interpolation processing) that produces a larger effect of enhancing the edge of the image (that is, produce a smaller effect of smoothing the discontinuous portion of block boundary) as compared with the bilinear interpolation mode (the second kind of interpolation processing). Hence, the blurred edges of the image can be reduced in the area except for the block boundary.

When the reference pixels include the block boundary, if the interpolation pixel is computed by the bicubic interpolation mode by the use of the reference pixels, there is a possibility that the interpolation pixel is computed with the discontinuous portion of block boundary (block noise) held and enhanced. Hence, in this case, the interpolation pixels are computed by the use of the bilinear interpolation mode (the second kind of interpolation processing) that produces a smaller effect of enhancing the edge of the image (that is, produces a larger effect of smoothing the discontinuous portion of block boundary) as compared with the bicubic interpolation mode (the first kind of interpolation processing). When the interpolation pixel is computed by the use of the bilinear interpolation mode, the discontinuous portion of the block boundary can be smoothed and reduced. Hence, it is possible to provide resolution changing that reduces the discontinuous portion (block noises) in the block boundary area of the image subjected to resolution changing and does not blur the edges of the image in the other area.

In the embodiment of the invention, the bilinear interpolation mode is used as a mode of computing the interpolation pixel for reducing the discontinuous portion of the block boundary. However, the other mode can be used, if the mode can produce the same effect.

A reference pixel selection unit 203 in FIG. 2 selects reference pixels with respect to the interpolation pixel from the reference pixel information and interpolation pixel position information, which are inputted by the pixel computation mode switching unit 202, and outputs the result of selection to a pixel extraction unit 204.

The pixel extraction unit 204 extracts reference pixels from the original image (image to be subjected to resolution changing) on the basis of the inputted reference pixel information (number and position) and transfers the reference pixels to an interpolation pixel computation unit 205. The interpolation pixel computation unit 205 applies the computation mode of the resolution changing mode selected by the pixel computation mode switching unit 202 to the reference pixels inputted by the pixel extraction unit 204 to obtain an interpolation pixel.

The execution method of the invention will be described with reference to a flow chart shown in FIG. 1. In this embodiment, as described above, the bicubic interpolation mode is used as regular (default) resolution changing (the first kind of interpolation processing) and the bilinear interpolation mode is used for resolution changing near the block boundary (the second kind of interpolation processing).

First, in the block boundary determination unit 201 in FIG. 2, a block boundary determination step S101 in FIG. 1 is executed. According to the result obtained at the block boundary determination step S101, whether or not the reference pixels, which are necessary for executing the bicubic interpolation mode at step S102, include the block boundary is determined. If it is determined at step S102 that the reference pixels do not include the block boundary, the program proceeds to step S103 and if it is determined at step S102 that the reference pixels include the block boundary, the program proceeds to step S104.

At step S103, a resolution changing mode A (bicubic interpolation mode in this embodiment) is selected because it is determined that the reference pixels, which are necessary when the bicubic interpolation mode is executed, do not include the block boundary. At step S104, a resolution changing mode B (bilinear interpolation mode in this embodiment) is selected because it is determined that the reference pixels, which are necessary when the bicubic interpolation mode is executed, include the block boundary.

Reference pixels are selected at a reference pixel selection step S105 on the basis of the resolution changing mode selected at step S103 or S104. At interpolation pixel data computation step S106, the interpolation pixel is computed by the resolution changing mode designated at step S103 or S104 by the use of the reference pixels selected at reference pixel selection step S105.

The above operation is repeatedly executed to all interpolation pixels to be computed, thereby generating an image after resolution changing from the original image.

The resolution changing mode A and the resolution changing mode B described at steps S103 and S104 in FIG. 1 show typical resolution changing modes. The resolution changing mode A shows a resolution changing mode that can produce a lager effect of enhancing edge as compared with the resolution changing mode B whereas the resolution changing mode B shows a resolution changing mode that can produce a lager effect of smoothing the discontinuous portion of the block boundary as compared with the resolution changing mode A.

This application claims priority from Japanese Patent Application No. 2004-66109 filed Mar. 9, 2004 and Japanese Patent Application No. 2005-40709 filed Feb. 17, 2005, which are hereby incorporated by reference herein.

What is claimed is:

1. A resolution changing method for changing the resolution of image data obtained by decoding an encoded data which is encoded by orthogonal transformation encoding processing in which an image data is split into blocks of a predetermined size, the method comprising:
a reference pixel selection step of selecting a plurality of reference pixels to be supplied to an operation of an interpolation pixel from the image data;
a determination step of determining whether or not an area comprising the plurality of reference pixels exists across a boundary of the block; and
an interpolation pixel data computation step of computing pixel data of an interpolation pixel by performing a first kind of interpolation processing by the use of a plurality of pixel data of the reference pixels if the area comprising the plurality of reference pixels does not exist across the boundary of the block, and of computing pixel data of an interpolation pixel by performing a second kind of interpolation processing by the use of a plurality of pixel data of the reference pixels if the area comprising the plurality of reference pixels exists across the boundary of the block,
wherein the second kind of interpolation processing produces a smaller effect of enhancing an edge of an image and a larger effect of smoothing a discontinuous portion of the boundary of the block as compared with the first kind of interpolation processing.

2. A resolution changing method according to claim 1, wherein the first kind of interpolation processing is interpolation processing by a bicubic interpolation.

3. A resolution changing method according to claim 1, wherein the second kind of interpolation processing is interpolation processing by a bilinear interpolation.

4. A resolution changing apparatus for changing the resolution of image data obtained by decoding an encoded data which is encoded by orthogonal transformation encoding processing in which an image data is split into blocks of a predetermined size, the apparatus comprising:
a reference pixel selection unit that selects a plurality of reference pixels to be supplied to an operation of an interpolation pixel from the image data;
a block boundary determination unit that determines whether or not an area comprising the plurality of selected reference pixels exists across a boundary of the block;
a pixel computation mode switching unit that determines a mode of computing pixel data of an interpolation pixel from pixel data of the selected reference pixels according to determination result by the block boundary determination unit;
a pixel extraction unit that extracts pixel data of the selected reference pixels; and
an interpolation pixel computation unit that computes pixel data of an interpolation pixel from the extracted pixel data of the reference pixels according to a mode determined by the pixel computation mode switching unit,
wherein the pixel computation mode switching unit determines a first mode for computing pixel data if the block boundary determination unit determines that the area comprising the plurality of reference pixels does not exist across the boundary of the block, and determines a second mode for computing pixel data that produces a smaller effect of enhancing an edge of an image and a larger effect of smoothing a discontinuous portion of the boundary of the block as compared with the first mode if the block boundary determination unit determines that the area comprising the plurality of reference pixels exists across the boundary of the block.

* * * * *